(12) United States Patent
Dubé et al.

(10) Patent No.: US 7,706,935 B2
(45) Date of Patent: Apr. 27, 2010

(54) ENERGY MANAGEMENT SYSTEM FOR MOTOR-ASSISTED USER-PROPELLED VEHICLES

(75) Inventors: Jean-Yves Dubé, Asbestos (CA); Pascal Larose, Sherbrooke (CA)

(73) Assignee: Systemes D'Energie et Propulsion EPS Inc., Sherbrooke, Quebec (CA)

( * ) Notice: Subject to any disclaimer, the term of this patent is extended or adjusted under 35 U.S.C. 154(b) by 272 days.

(21) Appl. No.: 11/575,021

(22) PCT Filed: Sep. 14, 2005

(86) PCT No.: PCT/CA2005/001393

§ 371 (c)(1),
(2), (4) Date: Mar. 9, 2007

(87) PCT Pub. No.: WO2006/029514

PCT Pub. Date: Mar. 23, 2006

(65) Prior Publication Data

US 2008/0071436 A1  Mar. 20, 2008

Related U.S. Application Data

(60) Provisional application No. 60/609,239, filed on Sep. 14, 2004.

(51) Int. Cl.
*G05D 3/00* (2006.01)
(52) U.S. Cl. .................. 701/22; 701/29; 701/34; 701/70; 180/169; 180/172; 280/734
(58) Field of Classification Search .............. 701/22, 701/29, 30, 32, 34, 70; 180/169, 172; 280/734; 482/1, 2
See application file for complete search history.

(56) References Cited

U.S. PATENT DOCUMENTS

| 4,860,763 A | 8/1989 | Schminke |
| 4,869,497 A | 9/1989 | Stewart et al. |
| 4,919,418 A | 4/1990 | Miller |
| 5,011,142 A | 4/1991 | Eckler |
| 5,037,089 A | 8/1991 | Spagnuolo et al. |
| 6,547,702 B1 | 4/2003 | Heidecke |
| 6,580,188 B2 | 6/2003 | Katagiri et al. |
| 6,626,805 B1 | 9/2003 | Lightbody |
| 6,629,574 B2 | 10/2003 | Turner |
| 6,684,971 B2 | 2/2004 | Yu et al. |
| 6,768,944 B2 * | 7/2004 | Breed et al. ............ 701/301 |
| 2002/0120382 A1 | 8/2002 | Hatanaka et al. |

* cited by examiner

FOREIGN PATENT DOCUMENTS

WO    WO 03/066421 A1    8/2003

*Primary Examiner*—Gertrude Arthur Jeanglaud
(74) *Attorney, Agent, or Firm*—Ogilvy Renault, LLP; Isabelle Chabot

(57) ABSTRACT

An energy management system for a motor-assisted user-propelled vehicle comprising a motor capable of assisting in propelling the vehicle and a rechargeable power supply for supplying energy to the motor. The system comprises: a user input for providing a desired value for each of at least one control parameter related to the user; a sensor for each control parameter for obtaining an actual value of the control parameter; a value comparator for receiving the desired value and the actual value of each control parameter and comparing them to generate a comparison signal for each control parameter; a command generator for generating a motor command using at least one comparison signal; and a motor controller for operating the motor, using the motor command, either to assist in propelling the vehicle, or act to recharge the power supply, in a way to bring the actual value closer to the desired value.

26 Claims, 6 Drawing Sheets

ENERGY MANAGEMENT SYSTEM FOR MOTOR-ASSISTED USER-PROPELLED VEHICLES

CROSS-REFERENCE TO RELATED APPLICATION

This patent application is a national phase entry of international patent application no. PCT/CA2005/001393 filed on Sep. 14, 2005 and published under no. WO 2006/029514 which claims priority on U.S. Provisional Application No. 60/609,239, filed on Sep. 14, 2004, by the present applicant, all of which are incorporate by reference herein.

BACKGROUND OF THE INVENTION

1. Field of the Invention

The invention relates to motor-assisted user-propelled vehicles such as an electric motor assisted bicycle. More specifically, the invention concerns an energy management system that controls the positive or negative motor output of the vehicle.

2. Background Art

Cycling is a very popular sport and has the main advantage of being an environmentally friendly mode of transportation and a very good way to maintain one's physical shape. The use of an electric motor to assist a man in propelling a bicycle is well known and has been introduced in the North-American market several years ago.

In going up a steep hill, the consumption of energy of the cyclist is increased dramatically since the energy required to fight against the gravity is increased. Increased energy consumption is also observed in the presence of an opposing wind. With the use of a power-assisted bicycle, a user can overcome such difficulties by commanding an electric motor to assist him in pedaling. Of course, using an electric motor means using a battery to supply power. Since batteries are generally quite heavy for their size and their energy storage capacity, one of the main challenges in the field of power-assisted cycling is to reduce the battery weight, while maintaining or increasing its energy storage capacity.

Aside from battery innovations, one attempt to overcome the weight/capacity problem has been to use an electric motor which can also work as a generator. When functioning in generator mode, the electric motor offers pedaling resistance to the user, converts the cyclist's energy to electric energy and uses the electric energy to recharge the battery. By recharging the battery while going down a hill, and using some power to go up, some of the energy is reused and the total energy consumption is lowered, which makes the battery last longer.

In order to determine the motor assistance or resistance, most prior art electric bicycles rely on a user activator. Similarly to how one changes the gears, the user increases or decreases the assistance or resistance level of the electric motor to suit his needs. The main problem with a fixed assistance level is that the user is not required to supply effort in order to propel the bicycle, and the bicycle may be considered to be a motor vehicle like a scooter.

To overcome this problem, some systems provide an assisted propulsion proportional to the user effort. The user effort is measured by a strain gauge disposed on the rear wheel shaft of the bicycle. A command box is used to process the user effort data and to command the motor to output power proportionally to the user effort. For example, the setting for motor output could be 25, 50, 100 or 200% of the user effort, the desired percentage being inputted by the user. In this application, the bicycle is never the only power source for propelling the bicycle.

One disadvantage of using a strain gauge to measure the user effort is its ineffectiveness when installed on the front wheel of a bicycle. Since some types of bicycle models do not allow the electric motor to be installed on the front wheel, these systems can only be installed on traditional bicycle models.

The act of changing the assistance level, in the first case, or proportion in the latter case, is disturbing to a user. For example, if one needs to change both the gears of his bicycle and the motor assistance or resistance in a hill, he may have already slowed down by the time these two operations have been executed.

The motor-assisted user-propelled vehicles are very limited in the quantity and type of parameters that may be set for the motor output to adjust to. The use of an automatic throttle control to a desired speed, a fixed output control, and fixed output ratio offer limited control possibilities.

SUMMARY OF THE INVENTION

There is a need for a bicycle which may automatically adjust its motor power output to a wide variety of user determined parameters. This would allow a user to ride more comfortably within a set of predetermined parameters without need to constantly adjust the desired motor output, and for the battery energy to last longer by automatically recharging the battery.

According to the insufficiencies noted in the prior art, it is an object of the invention to enhance the existing technology in the automatic control of the motor power output of motor-assisted user-propelled vehicles.

It is another object of the invention to provide an innovative power management system that controls the positive or negative motor output of a motor-assisted user-propelled vehicle according to certain parameters.

A broad aspect of the invention is to provide an energy management system for a motor-assisted user-propelled vehicle comprising a motor mounted on the vehicle and capable of at least assisting in propelling the vehicle and a rechargeable power supply capable of supplying energy to the motor. The system comprising: a user input for providing a desired value for each of at least one user control parameter related to the user; a sensor for each of at least one user control parameter for obtaining an actual value of the user control parameter; a value comparator for receiving the desired value and the actual value of each of at least one user control parameter and comparing the desired value and the actual value of each of at least one user control parameter to generate a comparison signal for each of at least one user control parameter; a command generator for generating a motor command using the at least one comparison signal; and a motor controller for operating the motor, using the motor command, to one of assist in propelling the vehicle, and act to recharge the power supply, in a way to bring the actual value closer to the desired value.

Another broad aspect of the invention is to provide a method for managing energy of a motor-assisted user-propelled vehicle comprising a motor mounted on the vehicle and capable of at least assisting in propelling the vehicle and a rechargeable power supply capable of supplying energy to the motor, the method comprising: providing a desired value for each of at least one user control parameter related to the user; obtaining an actual value of the at least one user control parameter; comparing the desired value and the actual value of the user control parameter; generating a comparison signal for each user control parameter; generating a motor command using at least one comparison signal; and operating the motor, using the motor command, to assist in propelling the vehicle, or act to recharge the power supply, in a way to bring the actual value closer to the desired value.

A further aspect of the invention is to provide a device for measuring cyclic acceleration variations of a motor-assisted user-propelled vehicle due to cyclic user propulsion efforts, comprising: a sensor for detecting slight cyclic variations in a speed of the vehicle and generating a vehicle speed signal; and a differentiator for differentiating the vehicle speed signal to obtain a vehicle acceleration signal; where slight cyclic variations of the acceleration signal due to the cyclic user vehicle propulsion efforts is used to deduct the proportional cyclic user effort.

A still further aspect of the invention is to provide a method for measuring cyclic acceleration variations of a motor-assisted user-propelled vehicle due to cyclic user propulsion efforts, comprising: detecting slight cyclic variations in a speed of the vehicle; generating a vehicle speed signal by using the detection; differentiating the vehicle speed signal to obtain a vehicle acceleration signal; and using slight cyclic variations of the vehicle acceleration signal due to the cyclic user vehicle propulsion effort to deduct the cyclic user effort.

A still further aspect of the invention is to provide a method to automatically adjust the ratio of the gear, or gear and chain system on the motor-assisted user-propelled vehicle. The self-adjustment of the gear ratio (or continuous variable ratio) will further increase the ability of the system to maintain the user in a range of effort that is appropriate to his conditions or needs. Once the system has calculated the user effort, it is then easy to compare this effort with a desired value in order to reduce the gear ratio if the effort is too elevated or to increase the gear ration if the effort is too light. An electric shifting system can be used in order to achieve the mechanical shifting.

The decision to change the mechanical ratio of the system or to adjust the motor/generator output will be decided upon the comparison of another input (usually the desired speed) in order to make the decision to shift the mechanical system or to provide compensation with the electrical system.

BRIEF DESCRIPTION OF DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENT

The present invention presents an energy management system for controlling the motor output of a motor-assisted user-propelled vehicle according to at least one user parameter. The system comprising a desired value input receiver, and a sensor for measuring an actual value, for each parameter. The system further comprising, a value comparator to compare the values, and a controller to command the positive or negative power output of the motor to bring the actual value closer to the desired value. The input receiver receives a desired value input for the control parameter, the sensor detects an actual value for the control parameter, the comparator compares the actual value to the desired value, and the controller directs the electric motor to increase, decrease or maintain its power output according to the result of the comparison.

One aim of a preferred embodiment is to compensate the gap between the desired body activity level and the body activity level possible with a traditional bicycle by providing a motor power output management system automatically generating assistance or resistance according to predetermined control parameters. The system is designed to help the user to maintain a desired level of body physical activity (rate of energy consumption), or to manage the total energy consumption of the user plus the motor in a variety of conditions.

Figure 1:
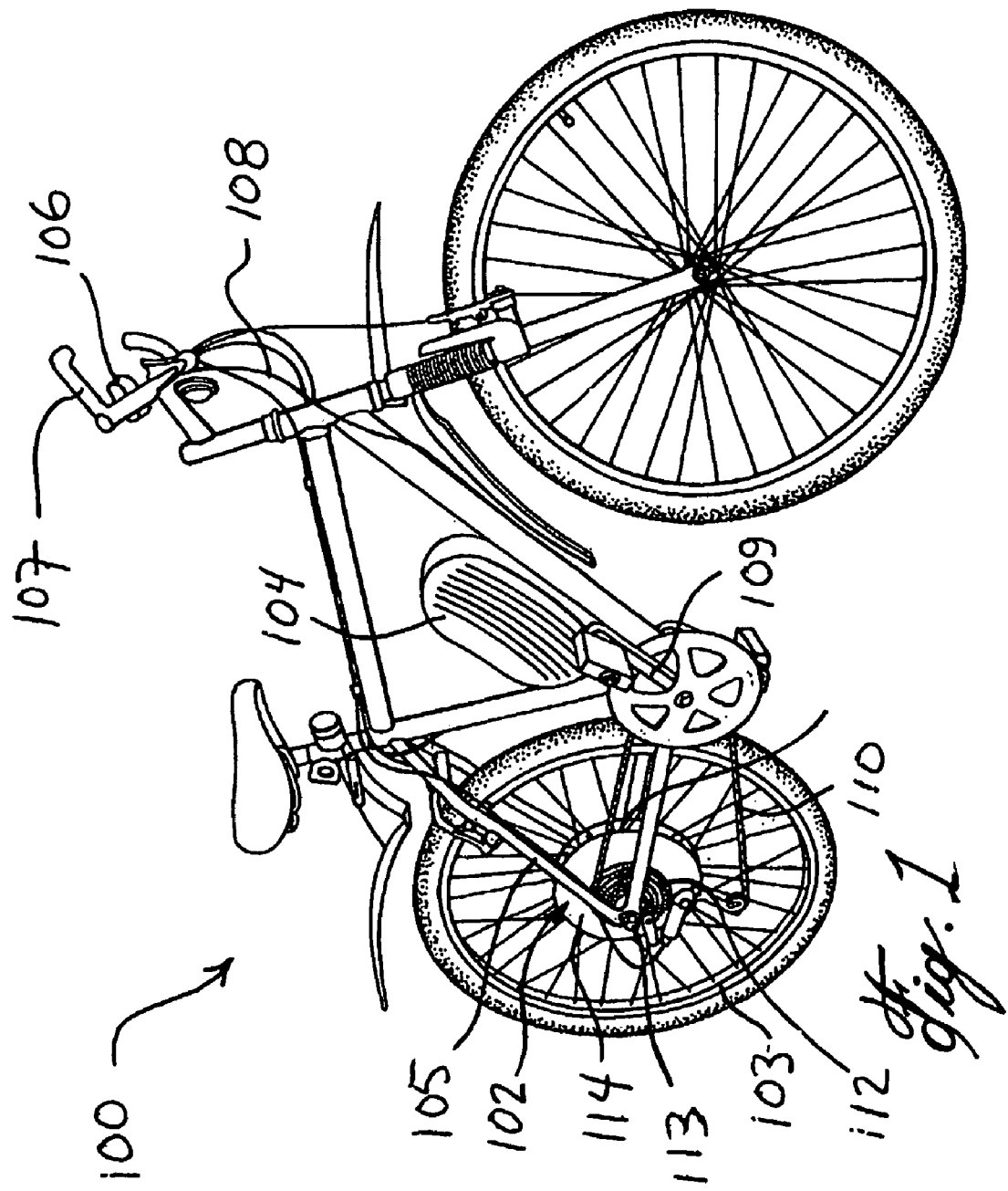
FIG. 1. is a perspective view of an electric-motor power-assisted bicycle.

FIG. 1 illustrates an example of a motor-assisted user-propelled vehicle, in this case, an electric-motor assisted bicycle 100. The expression "motor-assisted user-propelled vehicle" as used herein is intended to mean a vehicle comprising means to be user propelled, and in which a motor may assist the user in propelling the vehicle. A gasoline engine assisted bicycle, an electric-motor assisted wheelchair, a motor/generator assisted scooter, and a motor assisted pedal-boat with two users, are four examples of motor-assisted user-propelled vehicles. The term motor-assisted is to be interpreted as meaning that the motor can have at least a positive power output. It must not be interpreted textually as meaning a motor that may exclusively assist the propulsion nor is it meant to exclude a motor that may additionally provide a negative power output thereby acting as a generator, as it is the case in the preferred embodiment.

An electric motor/generator 102 is mounted on the rear wheel 103 of the bicycle 100. In this case, the motor is an electric motor, such as commonly used in power-assisted bicycles. As will be discussed in further detail hereinafter, the motor/generator 102 is defined in the illustrated embodiment as being a combination of a motor and generator. However, although the generic expression motor/generator 102 is used throughout, it is pointed out that both a motor and a generator could be used individually.

A battery 104, designed to supply electric power to the motor and to receive electric power from the motor, is mounted to the frame 105 of the bicycle, where a water bottle stand is typically placed. A user interface 106 is also fixed to the frame 105 of the bicycle, but is disposed near the bicycle handles 107 so a user may easily activate it even while pedaling. A processing unit is present but not shown on the figure, since it is preferably disposed inside the battery casing 104 (or any other suitable locations on the bicycle, such as inside the motor/generator 102) which is preferably water-resistant to protect electric and electronic components.

The user interface 106 is where the user inputs the parameter value, or set of parameter values, he wishes the motor power output to automatically adjust to. It is also possible that a user may select a pre-programmed training program by selecting it from a menu in the user input interface. Such a training program may automatically vary a parameter value or set of parameter values as a function of elapsed time or distance covered so the user will not have to change the value(s) while riding.

The user interface 106 may also comprise a visual or audible display that may assist the user in selecting his choices, and/or inform him of different things such as parameter actual and desired values, success in attaining parameter desired values, conflict between the selected parameter desired or actual values, or even an indicator to tell him that he must increase or decrease his own power output (effort) to achieve a set of parameter desired values.

The user activates the bicycle 100 by turning its pedals 109 which transfers his user power to the rear wheel 103 of the bicycle via a chain 110 and a set of gears 112.

There is at least one sensor for sensing an actual value for a user related control parameter is included in the power management system. Like a heart rate sensor, a user effort sensor like a cyclic user propulsion effort sensor, a breath depth sensor, a breath rhythm sensor, a perspiration sensor, or a blood pressure sensor. In this case, a speed sensor 114 is included, integrated to the electric motor 102 internal construction and connected to the processing unit, additionally to a sensor related to a user control parameter. Speed is a vehicle related control parameter, like vehicle acceleration, pedaling cadence, and battery energy level remaining.

The human body can produce a large amount of energy over a long period of time if the level of physical activity is maintained in the proper operating zone. The case of sprinters vs. marathon runners illustrates this statement very well. Sprinters can run very fast for a short period of time whereas marathon runners can run at a moderate pace for a longer period. However, in the end, for a given distance, the marathon runner will have used less energy because he has kept his body in an optimal energy consumption zone. The optimal performance for a given distance is often obtained while going at a regular moderate pace, thus maintaining a constant and moderate rate of energy consumption. The efficiency of the body is not linear over the range of different activity levels.

The efficiency of the battery in supplying energy to the motor is also not linear with the rate at which the energy is supplied. In creating an energy management system, this factor may or may not be taken into consideration.

In the present system, the prioritized component of energy to manage is the user's energy. It is well known (e.g., *Encouraging E-Bike Use: "The Need for Regulatory Reform in Australia"*, Geoff Rose and Peter Cock, Institute of Transport Studies, The Australian Key Centre in Transport Management, Department of Civil Engineering Building, 60 Monash University, Vic 3800) that passing a certain energy consumption rate can take someone into anaerobic exercise and can have negative consequences on a user. Therefore, it is important for health reasons to valorize the user's power output before optimizing the battery power output.

The user of an electrically assisted vehicle with the management system of the present invention would position himself on the machine and begin to operate the vehicle. The user would then feel the assistance or resistance increasing or decreasing as the vehicle seeks to maintain the desired total energy consumption (with both user and motor working to maintain such total energy consumption), the desired body activity level, the desired user energy consumption or more generally, to maintain an actual value for a parameter close to a desired value for that parameter. The processing unit continually adjusts the motor/generator assistance or resistance in order to attain this objective. Adjustments by the processing unit may also be performed periodically or set to the desire of the user of the vehicle.

The optimal performance of a motor-assisted user-propelled vehicle is often reached if the user's body is maintained at an optimal and constant activity level. A clear example of this would be for a cyclist going up, then down a hill. When going up the hill, the cyclist is probably working above the desired energy level, whereas when going down the hill, the cyclist has a lot more energy available than the amount necessary to propel the bicycle. On a regular bicycle, the user will stop producing energy (he will stop pedaling) when going down the hill and may even apply the brakes in order to maintain a safe speed. Hence, the kinetic energy of the moving mass is converted into heat at the brake, and is lost. In this last example, not only the speed energy (often called kinetic energy) is lost when going down the hill, but the energy and health benefits the cyclist could have generated if he had gone up and then down the hill at an optimal power generating rate is lost too.

In one embodiment of the invention, the user will input the desired heart rate he wishes to maintain. The processing unit will sense the actual heart rate and then command the motor to compensate the user effort in order to attain the desired heart rate. If the actual heart rate is below the desired heart rate, the motor will decrease the power output to reach the desired heart rate. If the motor used is capable of negative power output, the motor may not only reduce the assistance, but even work as a generator, thus offering resistance, or braking, and transforming the braking energy to electric energy used to recharge the battery. If the heart rate is above the desired heart rate, for example if the user is going up a hill, the processing unit will command the motor to increase the power output, thus the heart rate will be reduced to the desired heart rate.

Another application of this principle would be for a cyclist going in a curve and braking in order to maintain the maximum physical stall speed without crashing. In that specific curve, the cyclist has a lot more user energy and vehicle energy available than the energy necessary to move the bicycle. Thus, the motor battery will be recharged if the user sets a maximum speed, as a further control parameter, to be the maximum speed at which he can take the curve. He will then continue pedaling at his ideal operating rhythm, maintaining his heart rate, and the motor/generator will decrease its assistance, maybe even going into generator mode and recharging the battery. To facilitate the intervention of the user in such a case and in other instances, it is contemplated to provide a readily accessible throttle lever or rotating handle grip to allow the adjustment.

Thus, with the control system of the present invention set to maintain a desired heart rate used with a motor capable of operating in generator mode, the efficiency of the total energy used (motor energy+user energy) over the total distance of a ride might be less than if the user would have used while operating at a non optimal power generation rate, and will most definitely be less than if the generator does not recharge the battery.

The result is the optimization of energy consumption over a certain distance. The invention allows the user to preset one or more control parameter(s) desired value(s) to maintain. Once the system is as a function, it will maintain the control parameter(s) actual value(s) close to the desired value(s). For example, it may conserve heart rate and speed to cover a certain distance in a certain time. Preferably, the system will be disengaged as soon as the user gives the command to do so or touches the brake.

The system is also easily adaptable to many other types of motor-assisted user-propelled vehicles. Using a wheelchair, for example, one may set his heart rate as a control parameter and the system will control the motor/generator on the wheelchair in a way for the user to achieve his desired heart rate. The same could be done with a scooter, a pedal-boat, a kick scooter or a child stroller (i.e., to assist the person pushing the child stroller). All these motor-assisted user-propelled vehicles have something in common: the user's propulsion effort is done by cyclic impulses of force used to propel the vehicle.

Figure 2:
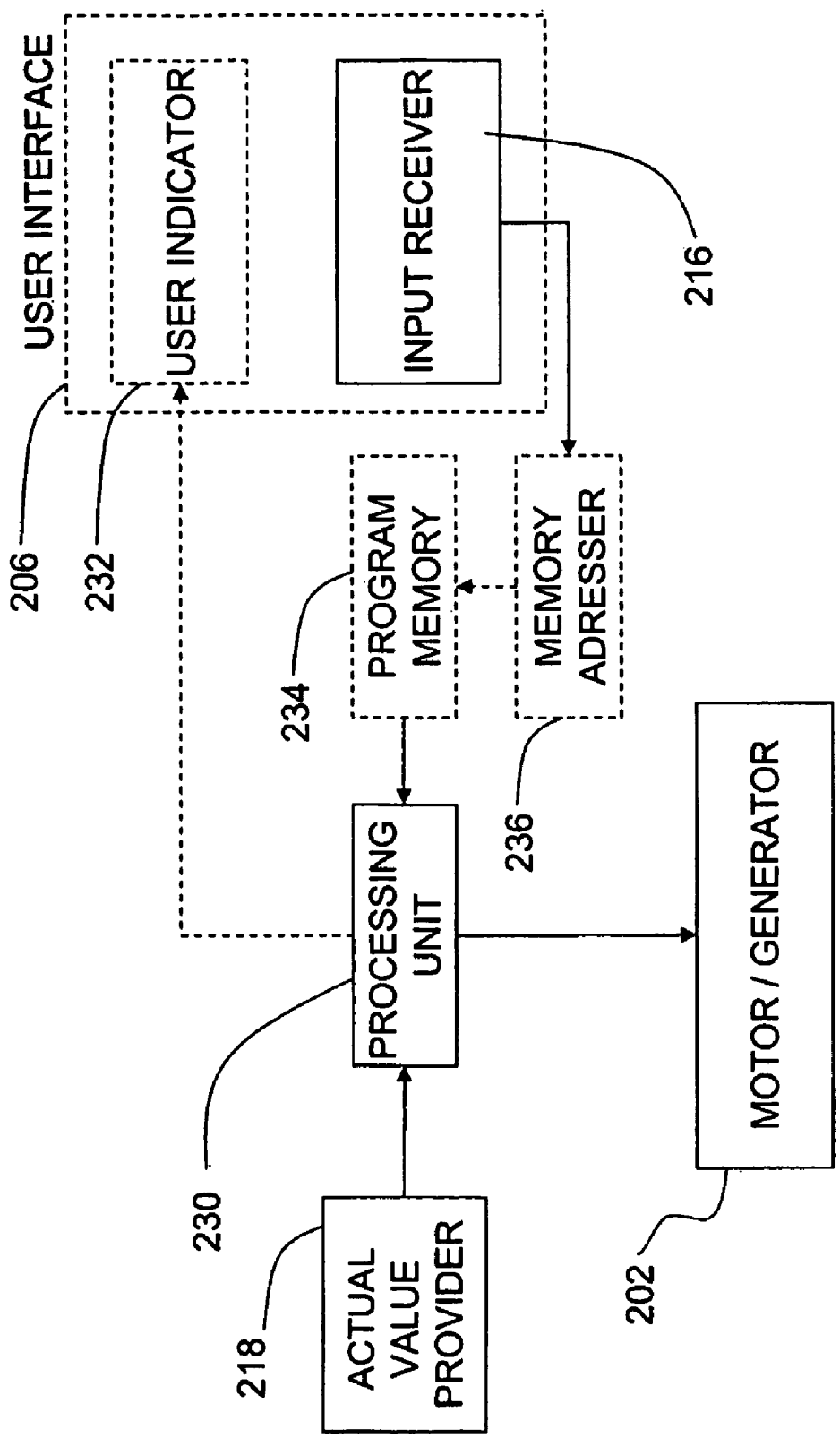
FIG. 2 is a block diagram of the principal components of a motor power output control system, including an optional incorporated training program.

FIG. 2 is a block diagram illustrating the main components of the motor power output control system for many types of motor-assisted user-propelled vehicles. An input receiver 216 receives a desired value input for at least one control parameter and an actual value provider 218 obtains the actual value of the control parameter. These values are fed to a processing unit 230 which controls the motor/generator 202 in a way to bring the actual value closer to the desired value.

For example, if the control parameter is heart rate, the user might want to keep a heart rate of 120 beats per minute (bpm), but his heart rate may only be of 90 bpm. In this case, the desired value is 120 bpm whereas the actual value is of 90 bpm. The desired value might be inputted by the user, whereas the actual value is, monitored by a heart rate sensor. The processing unit takes these two values into account and commands the motor/generator to decrease the motor assistance so the actual value of heart rate may rise to reach the desired value.

Different embodiments generally use different control parameters, and different sensors. For example, if the control parameter is the user's perspiration rate instead of the heart rate, a perspiration sensor is necessary to obtain the actual value of the user's perspiration rate.

Figure 3:
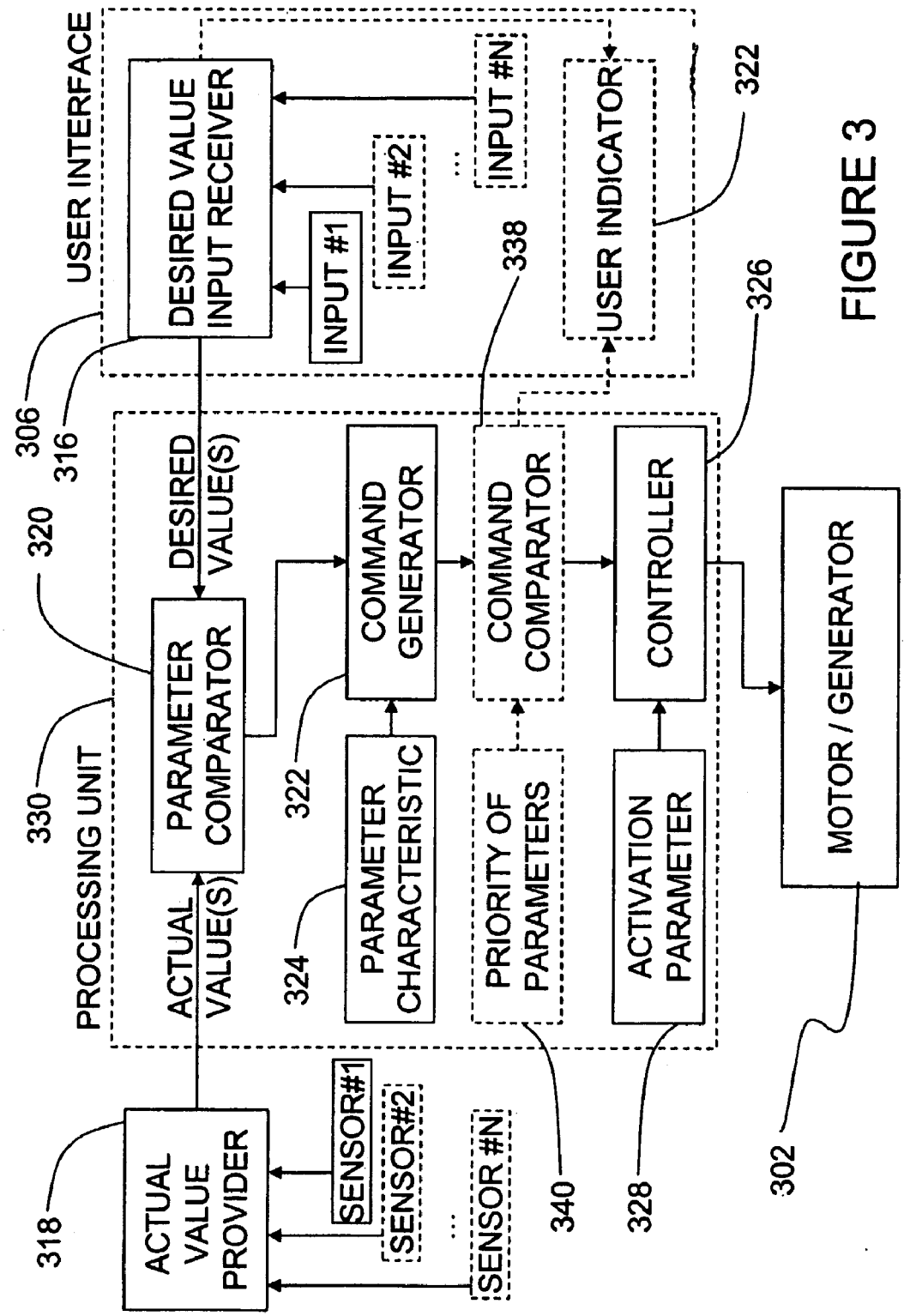
FIG. 3 is a block diagram of a motor power output control system detailing the internal components of the processing unit as well as the possible inputs and sensors.

FIG. 3 shows the details of the main internal components of the processing unit 230 of FIG. 2. As illustrated, the internal components of the processing unit 330 may or may not be enclosed within a single electronic or software component.

A command comparator 320 receives the signals from both the actual value provider 318 and the input receiver 316 and compares the actual value to the desired value. The actual value might be greater than, inferior to, or equal to the desired value. Following the previous example with speed as a control parameter, the actual value (90 bpm) was inferior to the desired value (120 bpm).

A command generator 322 receives the result of the comparison done by the command comparator 320 and converts the comparison result (<, >or=) to a command signal according to a preset parameter characteristic 324. There are three possibilities of commands: increase power output, decrease power output, or maintain power output. Following the speed example, the command "decrease power output" would be the appropriate one to bring the actual value (90 bpm) closer to the desired value (120 bpm), maybe going as far as putting the motor into generator mode for supplying resistance to the user and charging the battery. Oppositely, for speed as a control parameter, the corresponding command for an actual speed inferior to a desired speed would be "increase power output". Therefore, the parameter characteristic 324 tells which command is to be "matched" with which corresponding comparison result for a particular control parameter.

A controller 326 receives the signal from the command generator 322 and activates the electric motor/generator accordingly. The activation is done according to certain activation parameters 328. Following the example where the user heart rate is the control parameter, the activation parameter may command a slow variation of the motor output, to let the heart rate slowly adjust to the change in motor output. So, if there is resistance to be provided by the motor/generator to adjust the user effort and increase heart rate, and the motor was just generating a great deal of power output, the motor will decrease its power output slowly and gradually and then go into generator mode until the heart rate goes up, instead of moving into high resistance right away and potentially surprising and/or harming the user.

Now referring back to FIG. 2, an optional user indicator 232 is connected to the processing unit 230. The user indicator 232 and the user input receiver 216 may be incorporated into one user interface 206 which would comprise buttons for entering commands, and the indicator 232 for giving feedback from the control system.

The feedback given may be different according to different embodiments or uses. To begin with, the user indicator may be used to present the data given by any sensor 218 used in the system. The user indicator may also present data emerging from the processing unit, for example, the difference between the actual value and the desired value, the achievement of bringing actual value to desired value, or an indication that the actual value is departing from the desired value. The indicator may, for example, be an analog display of a string of lights or segments of an LCD displaying varying upwards and/or downwards depending on the degree of deviance of the actual value from the desired value.

Usually the indicator is a visual display, like a LCD display, but the indicator may also be audible, like a sound which could indicate that the user has attained the goal he had fixed for himself.

Another embodiment of the invention comprises the use of a memory component to store a training program in the control system. It will prove interesting to provide a training program in the processing unit to make the user's body activity level correspond to a desired activity level as a function of distance, time, speed, energy consumed, body maximum level of activity, etc. By increasing and decreasing the motor assistance over a period of time, one may get the same experience as when training on a programmed training bicycle, or device, but may also take advantage of the pleasures of riding outside.

FIG. 2 illustrates an embodiment of the motor power output control system using an optional training program selection. In this embodiment of the invention, instead of selecting a fixed desired value for a given control parameter, the user selects a training program. Therefore, in this case, the input received is the choice of a training program. Once selected, the training program will generate a desired value that may vary as a function of a variable such as elapsed time, distance traveled, energy consumed, etc. For example, a training program may automatically change the desired value of a user effort parameter as a function of time, gradually increasing the desired user effort value in order to allow the user to warm up before entering a high level of physical activity.

The program is stored in a program memory 234, and a memory location addresser 236 indicates which portion of the memorized program is to be used as a present desired value. For example, in a program that varies the value of desired user effort with elapsed time, the memory location addresser 236 could be a timer that indicates the current elapsed time which is necessary to locate the programmed desired user effort for that current elapsed time. If the program is to begin with a heart rate of 90 bpm, and after 15 minutes to gradually increase the heart rate to 120 bpm, the desired value emitted from the training program memory 234 will remain constant for the first 15 minutes, and then gradually increase to 120 bpm. The user therefore does not need to activate the change himself.

The processing unit can be programmed with desired rate of user energy consumption or body activity level or total energy consumption. This is particularly pertinent for heart disabled people that have to exercise gradually in order to recover from an operation.

The processing unit can be programmed to vary the desired rate of body energy consumption or body activity level or total energy consumption during the movement of the wheeled vehicle. For example, if the user wants to keep a low body activity level at the beginning and then after warm-up, increase the body activity level, the processing unit may be engineered to be easily programmed by the user as a function of the time, pedaling rhythm, energy consumed, heart rate, speed, distance traveled or energy remaining in the accumulator or fuel level. A cycle of different segments of body activity level or energy consumption, for example plateaus of high effort followed by plateaus of low effort resulting in a "sprint" routine, can also be easily programmed.

When several different users use the same vehicle, like in the case where the vehicle is rented, it will prove interesting that the user's preferred training program may be stored in a memory card or "smart card", so that the program selection may be done automatically by the user presenting his memory card to the system. Furthermore, the program memory might be interchangeable so different users may choose different program memories corresponding to personalized training programs. Other than the training program, other user preferences such as desired fixed heart rate or constant desired user effort may be stored and selected in this way. Thus, identification means may be added to automatically identify the particular user, and the processing unit may be responsive to the identification means to initially set the preset assistance or resistance, desired value(s), or training program at the start of use.

Direct measurements of individual effort and body energy consumption are preferred, such as blood pressure, heart rate, breath rhythm, electrical muscle activity, force on the wheel, etc. However, for cost purposes, it could be more economical to use indirect exercise-dependent measurements that need no complicated sensors, such as a cruising speed in which case the processing unit controls the assistance/resistance to maintain the cruising speed (similarly to a cruise control of an automobile). Such a cruise control can maintain a desired speed or a speed program with respect to time in, for instance, a training program.

The processing unit would in any event be programmed to match the assistance or resistance to the parameter(s). For example, with heart rate as the parameter, the processing unit would alter the assistance or resistance until the heart rate is maintained within the desired range. Although the assistance or resistance once set could thereafter remain constant for the vehicle, the system would preferably alter this assistance or resistance continually through the travel to enable the vehicle to maintain the system energy consumption or the body activity level within the designated parameters.

Figure 4:
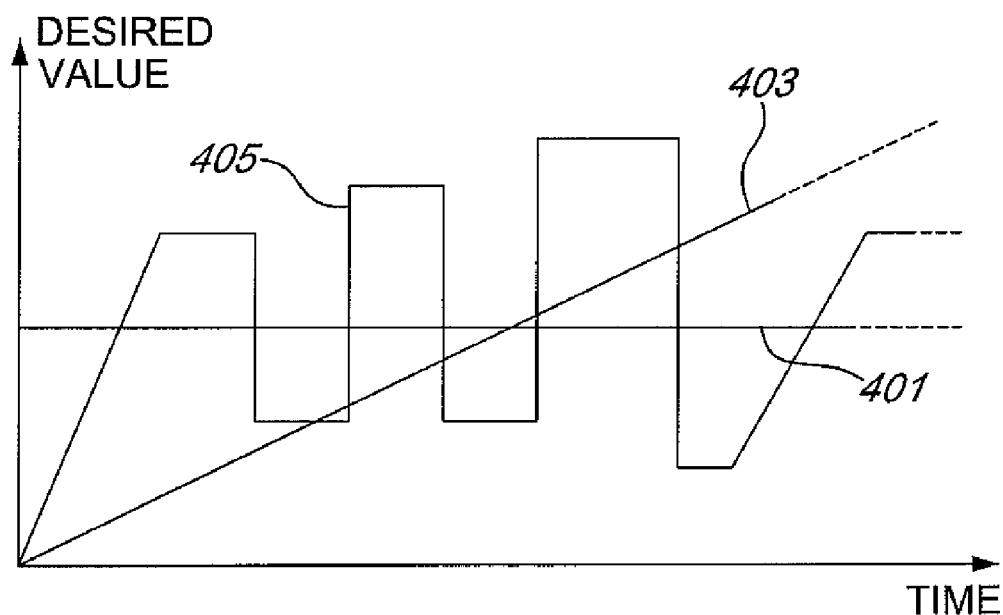
FIG. 4 is a schematic illustration of how user desired values may vary with time.

FIG. 4 shows various desired energy consumption or body physical activity levels possible over usage time. Line 401 is a linear desired body activity level or desired energy consumption level of the system. Line 403 is a constantly increasing desired body activity level or desired energy consumption of the system. Line 405 is an example of a training program with its variation of the desired activity level or the desired energy consumption level of the system.

Figure 5:
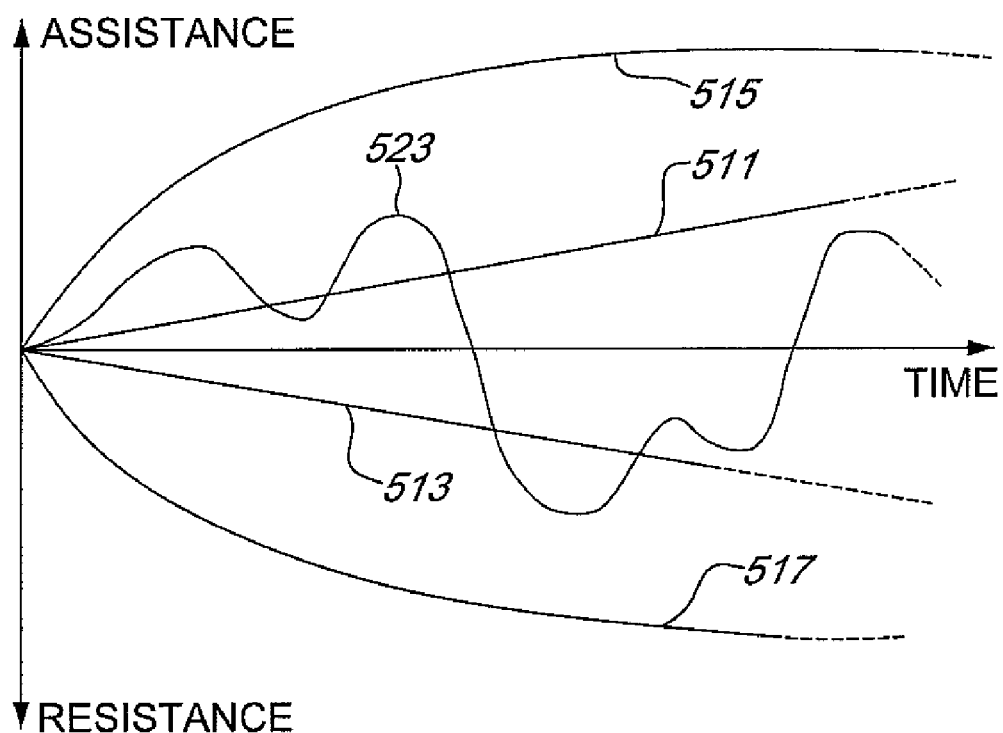
FIG. 5 is a schematic illustration of how the assistance or resistance of the motor-assisted bicycle varies with time to accommodate user desired values.

FIG. 5 shows various assistance or resistance curves over time. Lines 511 and 513 are constantly increasing assistance and resistance, respectively. Lines 515 and 517 are logarithmically inverse assistance and resistance curves, respectively. Line 523 is a variable assistance or resistance where the control system varies the motor output to reach or maintain a desired value, like a desired heart rate, but where the vehicle is, for example, going up and down hills. These lines may represent applications where different types of parameters have been preset into the processing unit. The line 523 is constantly varying to recognize the changing assistance or resistance that may be necessary to maintain compliance between a particular user's body activity level or user's energy consumption or total system energy consumption and the parameter programmed into the processing unit. For example, in order to retain a particular user's heart rate to be constant on an electrically assisted bicycle, the assistance is varied.

In some cases, the user will want to have the control system activate the motor according to two or more control parameters instead of only one. For example, one may desire to conserve both a desired speed, and a desired heart rate.

Referring back to FIG. 3, the control system can vary the motor/generator power output according to one, two or more control parameters. Each parameter taken into account necessitates an associated sensor and an associated input to provide both a desired and an actual value. Hence, the actual value provider 318 receives the signals from the sensors used for each control parameter, and the input receiver 316 receives the inputs for each control parameter. The desired values and actual values are sent to the comparator 320 that compares the actual value to the desired value and gives a corresponding comparison signal for each control parameter. These comparison signals are fed to the command generator 322 which generates an appropriate command for each control parameter accordingly to the characteristic 324 of each parameter.

The main difference between the single control parameter and the double or multiple control parameter applications is that in the single control parameter application there is only one command, whereas in the double or multiple control parameter application, there are two or more commands. These commands may be conflicting and contradictory. This is why an additional command comparator 338 is necessary for these applications. As will be seen in further detail, the command comparator may have many different types of functions depending on the quantity of control parameters used. Let us first discuss the application where only two control parameters are used.

In the two control parameter application, the commands for both parameters are input into the command comparator 338. This comparator 338 compares the command signals sent by the command generators. If both command generators give the same command, like increase motor output, the command is passed down to the controller 326 which activates the motor 302 correspondingly, according to certain activation parameters 328. However, if the commands are conflicting, for example if, one command is increase motor output whereas the other command is decrease motor output, there will be a contradiction: impossibility to satisfy both desired values at once by altering motor output.

In the case of contradiction, it will prove very advantageous to provide a user indicator 332, preferably part of the user interface 306, that will advise the user that the control system cannot satisfy both desired values by controlling the motor output. As it will be seen further on, the user indicator may even ask the user to either increase or decrease his/her power output in order to satisfy these parameters.

The user indicator 332 may be incorporated within a single user interface 306 with the input receiver 316. Furthermore, both comparators, 320 and 338, the command generator 322 and parameter characteristics 324, the controller 326 and the activation parameter 328 may be part of the processing unit, which may be enclosed within a single control box, and as preferred, placed within the battery waterproof casing, or in any other suitable location, such as the user interface casing.

With two control parameters, there are four possible command comparator output values for motor commands wherein two give a contradiction result.

TABLE 1

Possible command comparator outputs with two control parameters

| Parameter #1 | Parameter #2 | Result |
|---|---|---|
| Increase motor output | Increase motor output | Increase motor output |
| Increase motor output | Decrease motor output | Contradiction |
| Decrease motor output | Increase motor output | Contradiction |
| Decrease motor output | Decrease motor output | Decrease motor output |

In the contradiction cases, it may be possible that the motor cannot satisfy the control parameters by changing power output, but that the user may achieve both control parameter desired values by varying his own power output. The following table gives two exemplary uses of the control system with two control parameters, wherein the control parameters are the bicycle speed, and the user's heart rate. Both examples show a contradiction between the control parameters. As will be seen, in these examples, varying the user's effort will satisfy both parameters whereas varying the motor power output will not.

TABLE 2

Motor command contradiction examples

| | Parameter one, bicycle speed | Parameter two, user heart rate | Corresponding user command |
|---|---|---|---|
| Desired value example one | 12 km/h | 100 bpm | Decrease user effort |
| Actual value example one | 18 km/h | 130 bpm | |
| Desired value example two | 18 km/h | 130 bpm | Increase user effort |
| Actual value example two | 12 km/h | 100 bpm | |

Referring to example one in Table 2, the actual value of speed is 18 km/h and actual value of heart rate is 130 bpm, but the user has input the desired values of 12 km/h and 100 bpm. Neither increasing nor decreasing motor output will satisfy both desired values at once, they are in contradiction. However, it the user decreases his effort, both his speed and heart rate should diminish.

Example two of Table 2 is the opposite of example one: in this case, the user needs to increase his effort in order to satisfy both desired values. There is no motor command that will help the user achieve both desired values at once.

In the case of speed and heart rate as control parameters, it will be advantageous to provide an indicator 322 with a user command. The indicator, preferably a display, will ask the user either to "increase effort", or "decrease effort" so that he may achieve the personal goals he has set himself. Different sounds could also be produced by the indicator to indicate which action needs to be taken such as two types of beeps.

If there are conflicts between two parameters that are not in direct control of the user and that are not adjustable by assistance/resistance (e.g., heart rate and breath rhythm), one parameter will be satisfied in priority according to a pre-determined priority list. The user will be able to change the order of priority by using the user interface.

One advantageous use of the embodiment is for a person commuting to work. In a lot of cases, the commuter wants to get to work fast, but does not want to sweat. The sweat generation, perspiration, is directly linked to body activity. Using the pre-programmed functions of the invention, the user will set the maximum desired user activity level in order not to sweat, and set the speed he desires to maintain. The motor, controlled by the device, will then assist the user to maintain the desired speed by providing a power assistance, or power assistance ratio that will keep the user below his desired maximum activity level. This body activity level could correspond to the one associated with a regular brisk walk. The user will then be able to commute to work on his bicycle without sweating, at a speed superior to the one that could have been achieved without using the invention, while providing a suitable exercise to the user.

It is also possible that the invention be adapted to control the motor/generator according to three or more control parameters, in which case it may be necessary to provide parameter priorities or to manage a more complex indicator. In the illustration of FIG. 3, the command comparator 338 will be equipped to compare multiple commands. A parameter priority memory 340 may prove necessary for the command comparator to give out the appropriate command to the motor/generator 302 or to generate an appropriate message to the user indicator 322.

The preferred user interface will receive the input from the user and indicate feedback to the user. The information can be entered in the input receiver of the user interface via a keyboard, card or can be stored in memory. The user interface may also directly indicate feedback on the inputs the user is entering.

A feedback indicator that is easy to consult while riding (a series of lights or a changing audible tone for example) would inform the user of his success in maintaining the desired system energy consumption or body activity level.

The user interface of the present invention can be programmed by the user to set the maximum desired user body activity level or energy consumption of the user or the total energy consumption of the system (i.e. the sum of the energy consumption of the user and the energy consumption of the electric motor). The user interface can also be programmed by the user to set the minimum body activity level, the energy consumption of the user or the energy consumption of the system.

Normally, the system would fill the gap between the desired body activity level and the actual body activity level of the user by assisting or restricting the movement of the vehicle via the DC motor. For example, the DC motor may assist the pedaling action at a higher percentage when going up a hill, in which case the user would otherwise use more energy than he would be willing to. Also, the system can fill the gap between the desired energy consumption level of the system and the actual energy consumption of the system.

Figure 6:
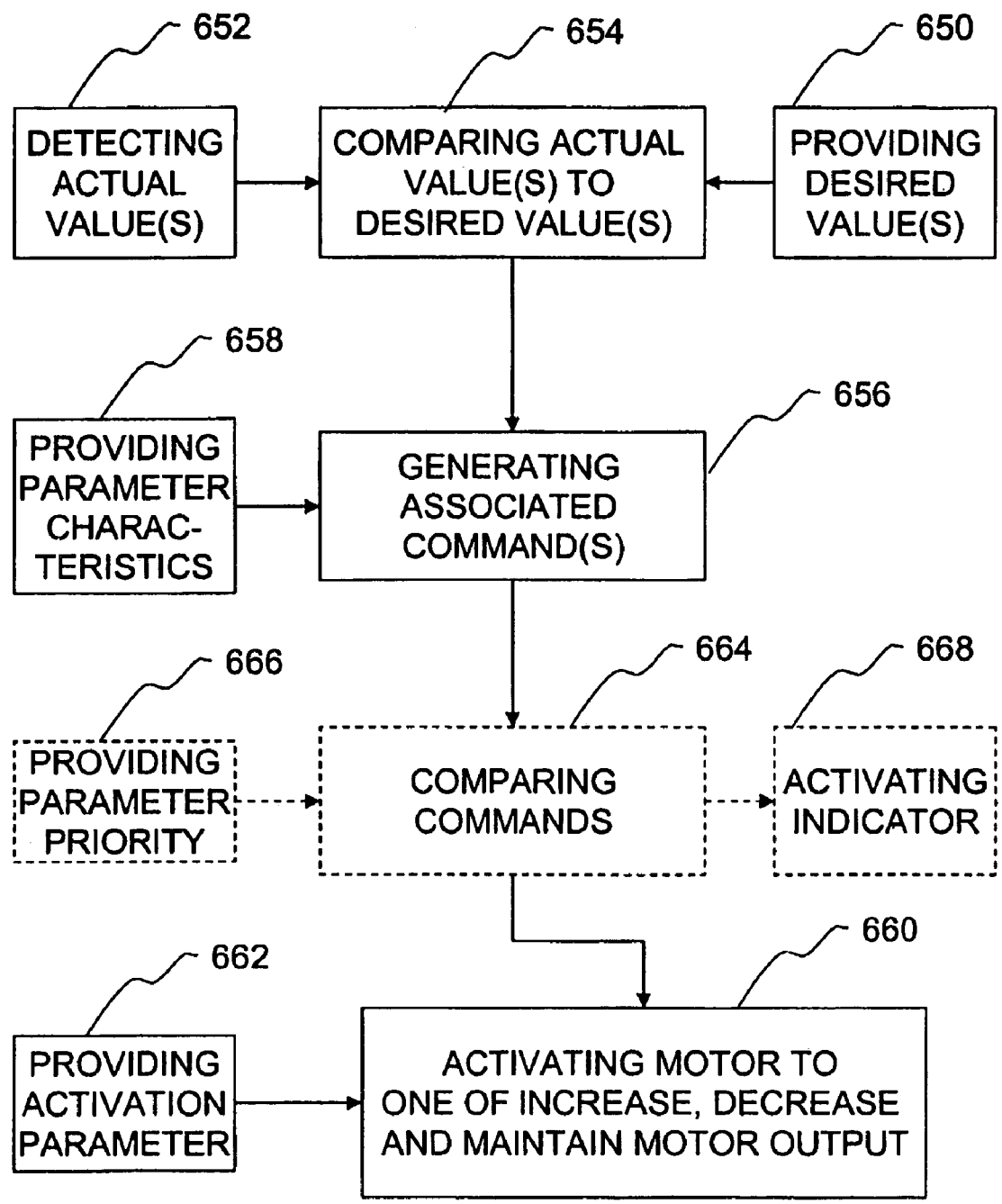
FIG. 6 is a flow chart of the main steps involved in controlling the motor power output.

FIG. 6 illustrates a flow chart of the main steps involved in controlling a motor/generator on a user-propelled vehicle according to a single control parameter.

First, for a given control parameter like speed, heart rate, breath rhythm, user effort or perspiration rate, a desired value is provided 650. It may be the user that enters a fixed desired value, or a training program selected by the user that automatically varies the desired value as a function of another parameter such as time elapsed or distance traveled. The desired value may also be obtained through a communication with an external source such as through a smart card programmed before using the vehicle and read by the interface. Also, the actual value of the control parameter is detected 652.

The two values are then compared 654. In theory, the actual value may be greater than, lesser than, or identical to the desired value, but the only two possibilities that are really of a practical importance are greater than and lesser than, for the comparator is not infinitely precise, and the "same as" possibility is practically always a transition state. Following the comparison, an associated command is then generated 656 according to the parameter characteristics 658. For example, if the heart rate is the control parameter, and the actual heart rate is below the actual heart rate, the motor command "decrease assistance", to increase the user heart rate, will result. Whereas for speed, the corresponding command for actual value below desired value will be "increase assistance". The parameter characteristics 658 determine which comparison result is "matched" with which command, and are preferably hard coded.

The possible command signals are increase, decrease and maintain motor power output. Practically, as it was the case with the comparison signal, the maintain motor power output command is more of a neutral state than a command provided by the command signal. So practically, there are two commands to match with two possible comparison signals.

The motor is then activated 660 depending on the nature of the command. The activation is done according to an activation parameter 662. The activation parameter generally provides a gradual change to the motor output. This is particularly important when the user has just entered 18 km/h as a desired value for a speed parameter and he is not moving at all. The activation parameter will provide a slow increase of motor output to a certain maximum, whereas a direct increase would probably propel the bicycle right out from between the user's legs, and potentially harm the user.

Also shown are some optional steps to the single control parameter embodiment to make it a two control parameter or multiple control parameter embodiment.

In double or multiple control parameter embodiments, one actual value is measured 652 and one desired value is provided 650 for each control parameter. The actual values are compared 654 to each corresponding desired value, and corresponding commands are generated 656 according to the parameter characteristic 658 of each control parameter.

Next, the generated commands are compared 664 to one another. If each control parameter generates the same command, there is no contradiction and the command may be used to activate 660 the motor/generator consequently. However, if the commands are different from one control parameter to the other, there is said to be contradiction and different actions may be taken, either the motor may be activated, or a user indicator may be activated to indicate the contradiction or a course of action to the user. A parameter priority 666 may be provided to set a higher priority to one parameter than another and thus activate 660 the motor according to its command depending on the commands given out for the other parameters. The parameter priorities and the activation parameters can be hard coded, obtained through communication with another system, or entered by the user.

In the embodiment with only two control parameters, a contradiction following the command comparison 664 may be solved by a modification of the user's power output. Hence, it will prove interesting in this case either to indicate the contradiction to the user, or even activate an indicator 668 to indicate a suggested action to the user, like "increase your effort", or "decrease your effort".

Figure 7:
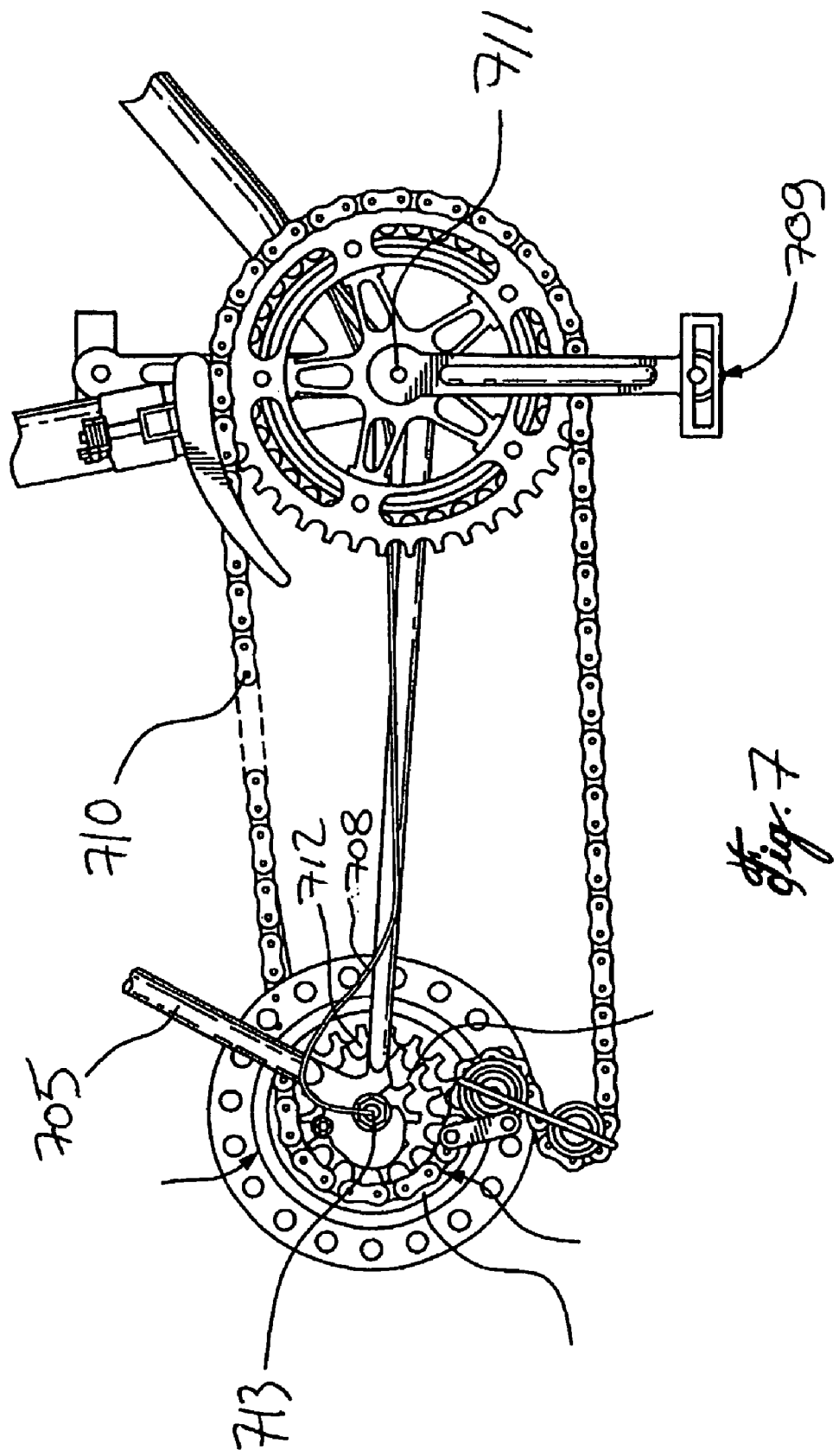
FIG. 7 is a schematic representation of the pedal and gear assembly for propulsion of a bicycle.

Referring now to FIG. 7, the force is produced on the pedals 709 by a user of a vehicle represented here as a bicycle. The pedals are interconnected to the rear wheel via sprockets and a chain or via a driving shaft. A rear wheel shaft 713 flexes under the pedaling force transferred via the chain and sprockets. The rear wheel shaft 713 is thus deformed. A strain gauge on the rear wheel shaft that flexes sends a variation of electric resistance, which represents, in electrical terms, the force on the rear wheel shaft. The shaft is therefore part of a sensor of user effort in this particular embodiment.

When there is a repetitive input of energy on the pedals of the vehicle, input energy is connected to the wheel or wheels via a chain or drive shaft to transmit energy to the wheeled system in order to turn a wheel and move the vehicle. The energy transmitted to the wheeled system is measured by calculating the associated force that causes the deformation of the fixed shaft of a rear wheel of the bicycle using a strain gauge or an arrangement of strain gauges. Similarly, a portion of the frame 705 of the bicycle could also be used. In another configuration of the present invention, the energy transmitted to the wheeled vehicle is measured by calculating the force that cause the speed of the system to vary using a linear or a rotating accelerometer or a linear or angular speed sensor. The energy is obtained by combining the force to the speed of the vehicle.

In one embodiment, the system uses the user effort as a user control parameter. In this case, the user will have the possibility of entering his desired user effort value, the processing unit will then work to command the motor in a way to attain and maintain his desired effort.

In double or multiple control parameter embodiments, the pedaling cadence can be used as a control parameter. More specifically, in order to optimize the use of a bicycle, pedaling cadence is often considered. For flat-road riding, high pedaling cadences (e.g., 90 rpm) are often suggested as being optimal. Accordingly, the cadence can be adjusted by the control system as a function of the effort-related user control parameter (e.g., heart rate). The control system can, for instance, be connected to the rear derailleur of the bicycle so as to change the gear ratio for the adjustment of the cadence in view of the effort-related control parameter. Once the system has calculated the user effort, it is then easy to compare this effort with a desired value in order to reduce the gear ratio if the effort is too elevated or to increase the gear ratio if the effort is too light. An electric shifting system can be used in order to achieve the mechanical shifting.

The decision to change the mechanical ratio of the system or to adjust the motor/generator output will be decided upon the comparison of another input (usually the desired speed) in order to make the decision to shift the mechanical system or to provide compensation with the electrical system.

The motor is preferably a DC motor and is connected to the wheel. The power for the DC motor is normally provided by an external connection to a box that comprises the processing unit and a battery.

In one embodiment of the invention which uses a user effort sensor, the following way of measuring the cyclic user propulsion effort allows the installation of the electric motor on either wheel of a bicycle.

Many types of user-propelled vehicles on which motor assistance is possible are propelled by cyclic impulses of force by the user, like it is the case in a wheelchair, a scooter, a pedal-boat, and a bicycle. The cyclic impulses of force, whether it is the arms of the user periodically turning the wheels of the wheelchair, the user's foot that periodically thrusts the scooter by pressing off the ground, or the pedaling action in a pedal-boat and a bicycle, all have in common that they produce slight cyclic speed and acceleration variations on the vehicle.

The cyclic variation in speed or acceleration due to the pedaling action in a bicycle is measured with a sensor. Hence, since the speed can be measured on any rotating part of the vehicle, using the speed to deduce acceleration results in providing a measure of pedaling strength that permits installation of the motor on either wheel of a bicycle without complication.

If the speed measurement is sufficiently precise, processing unit may differentiate the speed signal and provide an acceleration measurement using the equation: $a=\delta v/\delta t$. And since the cyclic acceleration measurement is directly linked to the user effort, the latter is deducted. An accelerometer can also be used to provide an acceleration signal directly, instead of differentiating the speed signal. An accelerometer may be placed anywhere on a bicycle, but may have the disadvantage of being more expensive than measuring and differentiating speed.

The force is produced on pedals 709 turning around an input shaft 711. These pedals, 709 are interconnected to a wheel via sprockets and a chain 710 or via a driving shaft and drives the wheel in order to maintain propulsion or traction of the vehicle. The input force on the input shaft 711 is normally a sinusoidal or a quasi-sinusoidal wave with the amplitude and the frequency depending upon the forces applied by the user on the system, on a bicycle for instance, each stroke of a pedal provides a force input. This input force is transmitted by mechanical linkage to the ground. The force transmitted to the wheel or wheels maintains speed, accelerates or decelerates the whole vehicle (with motor and user). Note that the speed and acceleration of the whole system is directly linked to the force applied by the user. Also note that this embodiment of the invention is also particularly well suited for the use on a leg propelled scooter where the driving force is directly applied to the ground by the user body.

Since the input force by the user is normally sinusoidal or quasi-sinusoidal, the speed and acceleration of the whole system will also be sinusoidal or quasi-sinusoidal. The period of the speed variation or the acceleration of the system will be the same or approximately the same for the whole system than the period of the force provided by the user at the input shaft 711. The amplitude of the speed variation or acceleration of the system will be directly linked to the amplitude of the speed variation or the acceleration provided by the user effort on the input shaft 711. Note that the amplitude of the acceleration will be influenced by the inertia of the system. The inertia is principally influenced by the mass and shape of the non moving parts of the system and the mass and shape of the rotating parts.

A speed sensor directly or indirectly connected (i.e. one front wheel or a rear propelled vehicle) to any system rotating part is able to measure the speed of the rotating part at any time. Any rotating part may thus be part of the sensor of this particular device. The signal of the speed is fed through a calculation box. Measuring speed at any time and feeding the speed signal to a calculation box that can be part of the sensor allows calculating speed variation on a period of time. Speed variation on the time period gives acceleration of the system. For a given inertia, the acceleration is directly related to the force applied on the system.

For practical reasons, the relative force will be used in preference to the absolute force. Also, for economical reasons, it will be less costly to approximate the relative force calculation by using only speed variation over one or many sinusoidal cycle(s). The force calculated by the calculation box is transformed into an electrical signal.

Other sensors that allow linear or angular acceleration measurement could also be used (rotating accelerometer or linear accelerometer, GPS speed sensor, strain gauges, inclinometer, wind sensor, speed variation sensors, etc.)

Also, as discussed, other sensors could also be utilized (torque sensors, force sensors, individual condition sensors, blood pressure sensor, heart rate sensor, electrical muscle activity sensor, etc.)

It is also considered to measure the force on each pedal in the case of a bicycle. It is known that riders generally have a leg stronger than the other. Accordingly, the assistance/resistance of the motor 102 can be actuated as a function of the difference in force applied to the pedals, to compensate for a weaker leg. Moreover, a pedaling cycle has dead points, in which the amount of force applied on the pedals is minimal. The assistance/resistance of the motor 102 can be actuated as a function of such dead points.

One way to measure the speed of the bicycle is to measure the speed at which the electric motor/generator turns when this motor is disposed directly on a wheel and when its speed is directly linked to the vehicle movement.

Using the principle of the reluctance motor, i.e., measuring the variation of current induced in the neutral branch of a tri-phase motor, we can measure the speed of rotation of a motor. This, we may also measure its variation and deduct acceleration.

In a preferred embodiment, the power management system will use detection and measurement means for monitoring body physical activity level (blood pressure, heart rate, electrical muscle activity, force at the wheel, etc.); body activity and energy consumption request means to be provided; digitizing means for digitizing a signal obtained from the detection and measurement means; energy calculation means to calculate, in real time, the user energy consumption provided by the user using the digitized signal; compensatory level calculation means for calculating an appropriate compensatory effort to be provided by the a DC motor mounted on the wheel using a value of the user energy consumption and a value of desired level of energy consumption requested; control means for controlling a compensatory effort to be provided by the DC motor mounted on the shaft of the wheel and using a value of the appropriate compensatory effort; wherein the user energy consumption and the level of compensatory effort are used to compensate and maintain the desired level of energy consumption of the vehicle and user system by the DC motor.

Hence, the invention will allow automatic variation of the electric motor power output from a current state of at least one control parameter (monitored by a sensor) to achieve a desired state of the corresponding control parameter (programmed by the user). As detailed above, the motor power output may be positive (assistance) or negative (resistance), and may be supplied either as a constant motor power output, or as a motor power output ratio relating to the user's power output.

It is also contemplated to use other types of energy storage, including non-rechargeable (during use) systems to actuate the motor during assistance. For instance, fuel cells can be used to generate the electric power necessary to actuate the motor. If the vehicle equipped with the fuel cell is to provide resistance, the motor associated with the fuel cell can reach a generator mode, with the generated power being accumulated in a secondary battery, or simply dissipated.

The system uses a minimum of one user control parameter related to the user, such as: user heart rate, user blood pressure, user muscle activity, user effort, user breath rhythm, user breath depth and user perspiration rate. The system may additionally use one or more vehicle control parameters related to the bicycle, such as bicycle speed, bicycle acceleration, pedaling cadence, battery energy level, motor power generation rate or battery temperature.

The user's power output, or user effort, may be measured either by the fixed shaft method, a speed derivation method, or any other method that may be advantageous depending on the embodiment of the invention.

The invention may be used to control the motor/generator according to two or more parameters. In these uses, it has proven to be advantageous to affix a display to the user interface to inform the user of his success in achieving the desired values corresponding to the chosen parameters.

It will also be useful to provide incorporated training programs that will vary the desired values of one or more control parameters accordingly to an allocation parameter such as time elapsed or distance traveled.

In varying embodiments, the invention could be installed on electric-motor assisted tricycles, wheelchairs, carts, mopeds, marine vehicles, scooters (e.g., kick scooters), bicycles, child strollers or other user-propelled vehicles.

Data collected during the use of the energy management system can be thereafter downloaded to a computer or processor, such that a history of a training program can be saved in a database, for subsequent reference thereto. A USB port, Bluetooth technology or the like can be used for the transmittal of the information to a computer.

The embodiments of the invention described above are intended to be exemplary only. The scope of the invention is therefore intended to be limited solely by the scope of the appended claims.

The invention claimed is:

1. An energy management system for a motor-assisted user-propelled vehicle comprising a motor mounted on said vehicle and capable of at least assisting in propelling said vehicle and a power supply capable of supplying energy to said motor, said system comprising:
    a user input for providing a desired value for each of at least one user control parameter related to said user;
    a sensor for each said at least one user control parameter for obtaining an actual value of said user control parameter;
    a sensor for at least one vehicle control parameter, for obtaining an actual value of said vehicle control parameter;
    a value comparator for
        receiving said desired value and said actual value of each said at least one user control parameter,
        receiving said actual value of said vehicle control parameter;
        comparing said desired value and said actual value of each said at least one user control parameter to generate a comparison signal for each said at least one user control parameter;
    a command generator for generating a motor command using said at least one comparison signal and said actual value of said vehicle control parameter, said command generator comprising a parameter comparator for receiving said comparison signal with said actual value of said vehicle control parameter and evaluating said comparison signal with said actual value of said vehicle control parameter to generate at least one of an indicator signal and said motor command using said evaluation; and
    a motor controller for operating said motor, using said motor command, to assist in propelling said vehicle in a way to bring said actual value of each said at least one user control parameter closer to said desired value of each said at least one user control parameter dependent on said evaluation.

2. The energy management system of claim 1 wherein said motor controller also operates said motor, using said motor command, to act to recharge said power supply.

3. The energy management system of claim 1 wherein said motor controller deactivates said motor in response to said comparison signal.

4. The energy management system of claim 1, further comprising an indicator for at least one of visually and audibly indicating to said user at least one of said desired value of said user control parameter, said actual value of said user control parameter, said actual value of said vehicle control parameter, data concerning said comparison signal and data concerning said motor command.

5. The energy management system of claim 1 wherein said sensor obtains said actual value repeatedly over a predetermined period of time, and wherein said value comparator receives, compares, and generates repeatedly over said predetermined period of time.

6. The energy management system of claim 5 wherein said user input comprises a training program provider for providing at least one said desired value that varies over time according to at least one of elapsed time of a usage of said vehicle, energy spent and distance covered during said usage.

7. The energy management system of claim 1 wherein said user control parameter is at least one of: user effort, cyclic user-induced acceleration, user pedaling rate, user heart rate, user breath rhythm, user breath depth, user perspiration rate, and user blood pressure.

8. The energy management system of claim 1 wherein said user input further provides
    a desired value for each of said at least one vehicle control parameter related to said vehicle;
    wherein said value comparator further
        receives said desired value of each said at least one vehicle control parameter, and
        compares said desired value and said actual value of each said at least one vehicle control parameter to generate a comparison signal for each said at least one vehicle control parameter.

9. The energy management system of claim 8 wherein said parameter comparator receives each said comparison signal and evaluates all said comparison signals to generate at least one of said indicator signal and said motor command using said evaluation.

10. The energy management system of claim 9 wherein said indicator signal comprises an alert message for warning said user of a contradicting conclusion of said evaluation; and wherein said system further comprises an indicator for receiving and presenting said indicator signal to said user.

11. The energy management system of claim 1 wherein said vehicle control parameter is at least one of bicycle speed, a level of energy in said power supply, a bicycle acceleration, and pedaling cadence.

12. A method for managing energy of a motor-assisted user-propelled vehicle comprising a motor mounted on said vehicle and capable of at least assisting in propelling said vehicle and a power supply capable of supplying energy to said motor, said method comprising:
    providing a desired value for each of at least one user control parameter related to said user;

obtaining an actual value of said at least one user control parameter;

obtaining an actual value of at least one vehicle control parameter;

comparing said desired value and said actual value of said at least one user control parameter;

generating a comparison signal for each said at least one user control parameter;

evaluating said comparison signal with said actual value of said at least one vehicle control parameter;

generating at least one of an indicator signal and a motor command using said at least one comparison signal and said actual value of said at least one vehicle control parameter; and operating said motor, using said motor command, to assist in propelling said vehicle in a way to bring said actual value of each said at least one user control parameter closer to said desired value of each said at least one user control parameter dependent on said vehicle control parameter.

13. The method for managing energy of claim 12, further comprising operating said motor to act to recharge said power supply.

14. The method for managing energy of claim 12 further comprising operating said motor to deactivate said motor, using said motor command.

15. The method for managing energy of claim 12, further comprising activating an indicator for at least one of visually and audibly indicating to said user at least one of said desired value of said user control parameter, said actual value of said user control parameter, said actual value of said vehicle control parameter, data concerning said comparison signal and data concerning said motor command.

16. The method for managing energy of claim 12 wherein said steps of obtaining, comparing, generating and evaluating are repeated over a predetermined period of time.

17. The method for managing energy of claim 12, further comprising:

providing a desired value for each of said at least one vehicle control parameter related to said vehicle;

obtaining said actual value of said at least one vehicle control parameter;

comparing said desired value and said actual value of said at least one vehicle control parameter; and generating a comparison signal for each said at least one vehicle control parameter.

18. The method for managing energy of claim 17, wherein said step of comparing involves comparing each comparison signal and said step of evaluating involves evaluating all said comparison signals so as to generate at least one of said indicator signal and said motor command using said evaluation in the step of generating.

19. The method for managing energy of claim 12 wherein said vehicle control parameter is at least one of bicycle speed, a level of energy in said power supply, and bicycle acceleration.

20. The method for managing energy of claim 12 wherein one of said at least one control parameter is cyclic user propulsion effort, further comprising:

detecting slight cyclic variations in a speed of said vehicle;

generating a vehicle speed signal by using said detection;

differentiating said vehicle speed signal to obtain a vehicle acceleration signal; and using slight cyclic variations of the vehicle acceleration signal due to the cyclic user vehicle propulsion effort to obtain said actual value of said cyclic user effort.

21. The energy management system of claim 1 wherein one said at least one user control parameter is cyclic user propulsion effort, and wherein said sensor for obtaining said actual value of said cyclic user propulsion effort comprises:

a detector for detecting slight cyclic variations in a speed of said vehicle due to said cyclic user propulsion effort and generating a vehicle speed signal; and a differentiator for differentiating said vehicle speed signal to obtain a vehicle acceleration signal;

wherein slight cyclic variations of the acceleration signal due to the cyclic user propulsion efforts is used to deduct the proportional cyclic user effort.

22. A sensor for obtaining an actual value of cyclic user propulsion effort for propelling a motor-assisted user-propelled vehicle for which the cyclic user propulsion effort is done by cyclic impulses of force by a user, said sensor comprising:

a detector for detecting slight cyclic variations in a speed of said vehicle, said slight cyclic variations being caused by said cyclic impulses of force by the user, said detector being one of directly and indirectly connected to any rotating part of said user-propelled vehicle and generating a vehicle speed signal; and a differentiator for differentiating said vehicle speed signal to obtain a vehicle acceleration signal;

wherein at least one slight cyclic variation of the acceleration signal due to the cyclic user propulsion efforts is used to deduct said actual value of proportional cyclic user propulsion effort.

23. A method for measuring cyclic parameter variations of a motor-assisted user-propelled vehicle due to cyclic user propulsion efforts, comprising:

detecting slight cyclic variations in a parameter of said vehicle;

generating a vehicle parameter signal by using said slight cyclic variations in said parameter detected; and using slight cyclic variations of the vehicle parameter signal due to the cyclic user vehicle propulsion effort to deduct the cyclic user effort.

24. The method for measuring cyclic parameter variations of claim 23, further comprising a step of differentiating said vehicle parameter signal when the parameter is speed to obtain a vehicle acceleration signal prior to deducting the cyclic user effort.

25. The method for measuring cyclic parameter variations of claim 23 wherein the parameter is a force applied to a component of the vehicle.

26. The method for measuring cyclic parameter variations of claim 25, wherein the force is measured using a strain gauge on the component.

* * * * *